July 7, 1936.   R. G. LA FOUNTAIN   2,046,468
AUTOMATIC VARIABLE SPEED MECHANISM AND BRAKE ELEMENT THEREFOR
Filed March 25, 1935   2 Sheets-Sheet 1

Inventor
Richard G. LaFountain
By
Lyon & Lyon
Attorneys

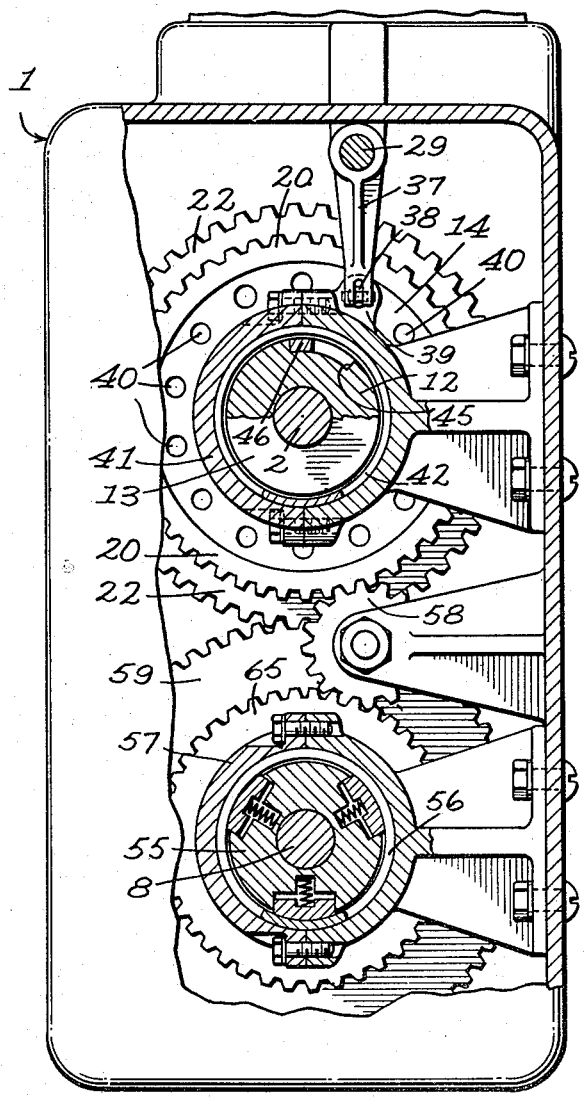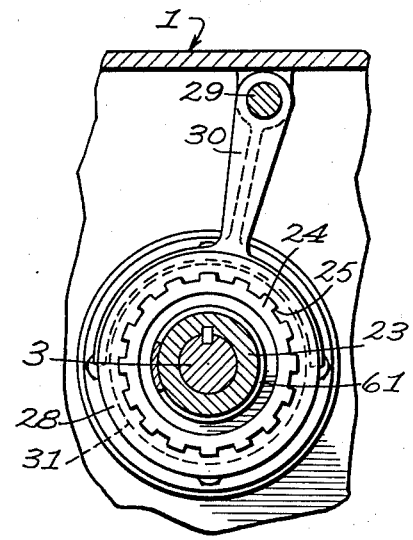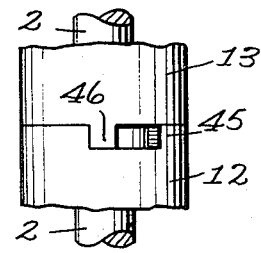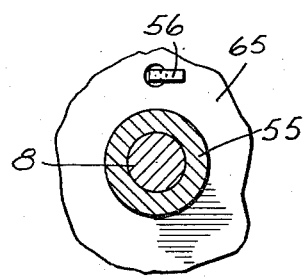

Patented July 7, 1936

2,046,468

UNITED STATES PATENT OFFICE 2,046,468

AUTOMATIC VARIABLE SPEED MECHANISM AND BRAKE ELEMENT THEREFOR

Richard G. La Fountain, Los Angeles, Calif., assignor to Phoebe Margarette La Fountain Application March 25, 1935, Serial No. 13,004

15 Claims. (Cl. 74—259)

This invention relates broadly to braking and clutching mechanisms and has particular application in automatic variable speed power transmitting mechanisms.

A broad object of the invention is to provide a simple, inexpensive, reliable and smooth acting braking mechanism for restraining a shaft or other rotatable element from rotation in response to predetermined low driving torques applied thereto while permitting it to rotate unrestrained in response to higher driving torques.

Another object is to provide a simple and practicable variable speed power transmitting mechanism automatically responsive to torque.

Other more specific objects and features of the invention, together with a full understanding of the invention, may be had from the following detailed description which refers to the drawings.

In the drawings:

Fig. 2 is a vertical section at right angles to the section of Fig. 1, taken along the irregular line II—II in Fig. 1;

Fig. 3 is a detailed cross section taken in the plane III—III of Fig. 1;

Fig. 4 is a detailed view taken in the plane IV—IV of Fig. 1; and

Fig. 5 is a detailed plan view of a hub assembly used in the system.

Figure 1:
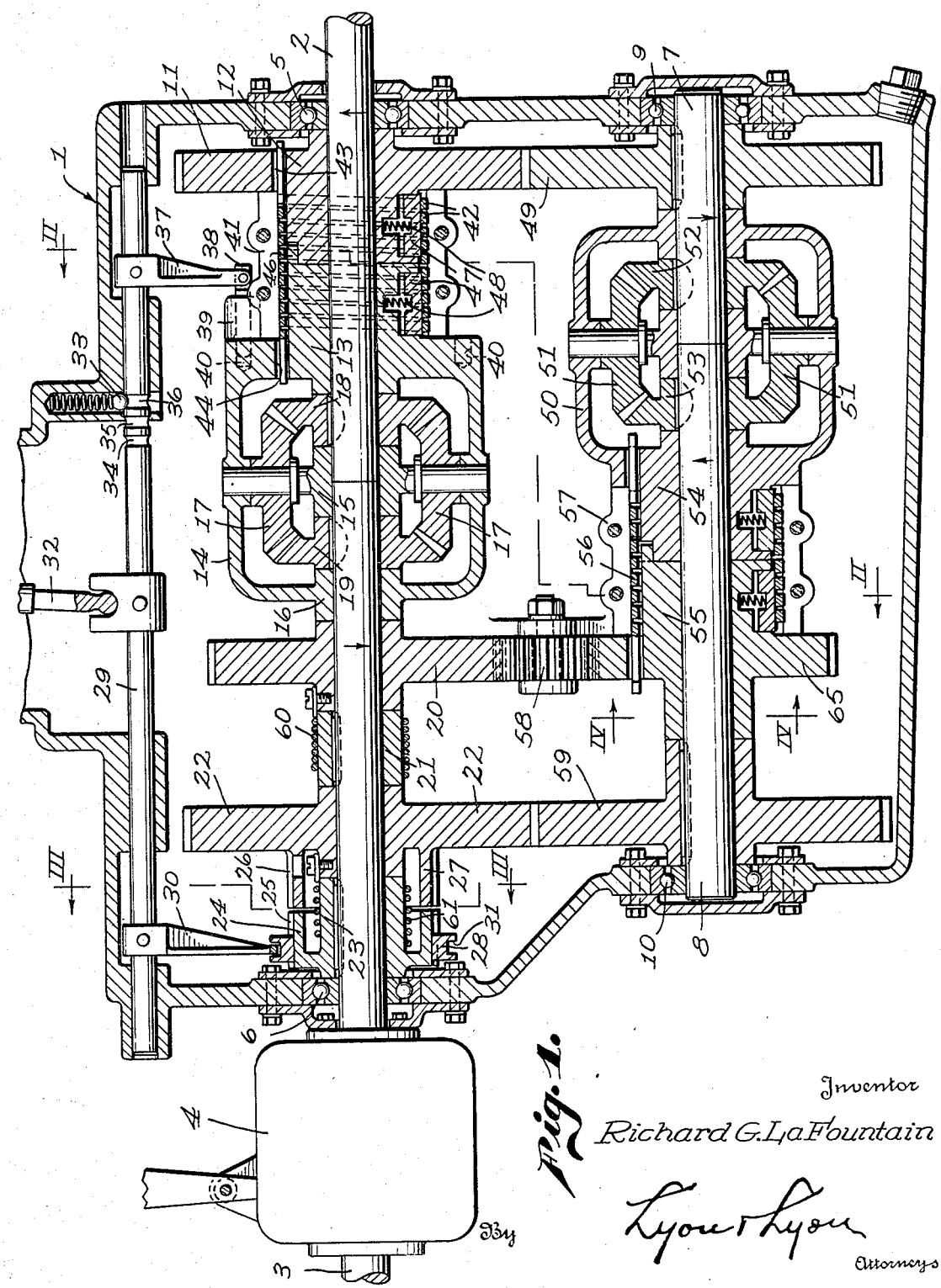
Fig. 1 is a vertical section through a variable speed power transmitting mechanism in accordance with the invention.

As illustrated in the drawings, the invention is disclosed as incorporated in a variable speed power transmitting mechanism comprising a case 1, into which a driving shaft 2 projects at one end and from which a driven shaft 3 projects at the opposite end. Shafts 2 and 3 are in alignment and shaft 3, as shown in the drawings, projects into the case 4 of a reversing mechanism, the detailed construction of which does not constitute a part of the present invention and is immaterial thereto. Shafts 2 and 3 are rotatably supported in ball bearings 5 and 6, respectively, where they pass through the walls of the casing 1. A pair of aligned counter shafts 7 and 8, respectively, are positioned in the lower part of the casing 1 and are rotatably supported at their opposite ends in ball bearings 9 and 10, respectively.

Mounted loosely upon the driving shaft 2 for free rotation thereabout are a gear 11 having an integral hub 12 and a cooperating hub 13, the latter being formed integrally with a differential housing 14 which is also rotatably supported at the center by an integral hub 15 and at the rear by an integral hub 16, all freely rotatable about the shafts 2 and 3. The differential housing 14 has rotatably supported therein a plurality of differential bevel pinions 17 which engage with a bevel gear 18 which is keyed to shaft 2 and a bevel gear 19 which is keyed to shaft 3. Positioned back of the differential housing 14 and rotatably mounted upon the shaft 3 is a gear 20, the hub of which is positioned between the hub 16 and a sleeve 21 which is keyed to shaft 3. A gear 22 is rotatably mounted upon shaft 3 back of the sleeve 21 and in front of a collar 23 which is keyed to shaft 3.

Collar 23 is provided with an annular flange 24 having splines 25 thereon which align with splines 26 on an annular shoulder 27 projecting from the gear 22, and a splined sleeve or collar 28 is positioned about the flange 24 and is adapted to slide into engagement with the splines 26 on the flange 27 to lock the collar 23 to the gear 22 in response to sliding movement of a shifting rod 29. Thus the rod 29 is provided with a fork 30 which engages in a groove 31 in the collar 28.

The shifting rod 29 may be actuated by a lever 32 which projects from the top of the casing 1, the lower end only of which is shown in the drawings. To restrain the rod 29 in any one of three longitudinal positions into which it may be moved, a ball detent 33 is provided which is adapted to engage in any one of three grooves 34, 35 and 36 in rod 29. Adjacent its forward end the rod 29 is provided with an arm 37 which is connected to a lock pin 38 slidably mounted in a guide 39 affixed to the casing 1, the pin 38 being adapted to engage in one of a plurality of holes 40 provided in the front face of the differential housing 14 to lock the latter against rotation.

Surrounding the hubs 12 and 13 but spaced therefrom is a stationary annular housing 41 which is affixed to the casing 1 and is provided with an inner cylindrical surface concentric with but of larger diameter than the hubs 12 and 13 and defining therewith an annular space in which a brake spring 42 is positioned. This spring 42 is a helical spring of rectangular cross section as shown and is secured at its forward end to the gear 11 and at its rear end to the differential housing 14; thus the forward end of the spring may be bent longitudinally and passed through an aperture 43 in the gear 11 and the rear end of the spring may be bent longitudinally to engage in an aperture 44 in the differential housing 14. This spring 42 is normally of larger external diameter than the diameter of the cylindrical surface of the housing 41 so that it expands tightly against the housing, thereby tending to prevent rotation of either the differential housing 14 or the gear 11. However, if sufficient torque is applied to the spring and in the right direction, it will contract away from the housing 41 into tight engagement against the hubs 12 and 13, thereby releasing the differential housing 14 and gear 11 for free rotation.

To positively limit the amount of free play between the hubs 12 and 13, the latter are preferably provided with dogs 45 and 46, respectively, on their abutting faces, which dogs interengage following a predetermined relative movement between the hubs 12 and 13. The relative movement between the dogs 46 and 45 may be greater than that required to contract the spring 42 snugly about the hubs 12 and 13, in which case the dogs serve no purpose except in case of breakage of the spring 42. On the other hand, if desired the circumferential spacing between the dogs 45 and 46 may be so adjusted that the dogs engage following contraction of the spring 42 sufficient to disengage the housing 41 but insufficient to tightly wrap the spring about the hubs 12 and 13, thereby limiting the strain that can be applied to the spring.

To reduce the size of the spring 42 it may be advisable to employ spring actuated plungers 47 forced outwardly by spiral springs 48, the plungers 47 being mounted in grooves provided therefor in the hubs 12 and 13 (see Fig. 2). These plungers normally force the spring 42 out tightly against the housing member 41 but are contracted into position flush with the surfaces of the hubs 12 and 13 when the spring 42 is contracted by torque applied thereto.

A gear 49 is keyed to the counter shaft 7 and meshes constantly with gear 11. Positioned back of the gear 49 and loosely mounted for rotation about the shafts 7 and 8 is a differential housing 50 having differential bevel pinions 51 which mesh with bevel gears 52 and 53 keyed to shafts 7 and 8, respectively. The differential housing 50 terminates at its rear end in a hub 54 which abuts against hub 55 attached to a gear 65. Hub 55 is loosely mounted for rotation about shaft 8 and the two hubs are provided with interlocking dogs substantially the same as the hubs 12 and 13. Likewise the hubs 54 and 55 are surrounded by a heavy helical spring 56 which is normally expanded outwardly against the cylindrical surface of a stationary housing member 57, the opposite ends of the spring 56 being secured to the differential housing 50 and the gear 65, respectively, and functioning in identically the same manner as the spring 42 to restrain the differential housing and the gear 65 from rotation until the torque applied through the spring exceeds a predetermined magnitude. Gear 65 meshes with an idler gear 58 which in turn meshes with the gear 20, the idler gear 58 being provided solely for the purpose of causing the gear 20 to rotate in the same direction as the gear 65. Positioned back of the gear 65 and keyed to the shaft 8 is a gear 59 which meshes constantly with the gear 22 on the driven shaft 3.

The gear 20 has attached thereto at one end a helical spring 60 which is wound about the sleeve 21 and functions therewith as an overrunning clutch to permit the gear 20 to drive the shaft 3 while permitting the shaft to overrun the gear. Likewise the gear 22 has attached thereto one end of a helical spring 61 which is wrapped about the sleeve 23 and functions therewith as an overrunning clutch to permit the gear 22 to drive the shaft 3 but allow the shaft 3 to overrun the gear 22.

The device functions as follows: Assume that the rod 29 is so positioned that the groove 35 is engaged by the ball detent 33, in which position the spline collar 28 is out of engagement with the spline hub 26 and the pin 38 is out of engagement with the differential housing 14. Assume further that the shaft 2 is being rotated in clockwise direction by any suitable source of power, (the directions of rotation of various elements as hereinafter referred to will be taken looking from right to left in Fig. 1), and that the driven shaft 3 is connected through the reversing mechanism 4 to a variable load.

The shaft 2 rotates the gear 18, which in turn tends to either rotate the differential pinions 17 about their axes or to revolve the pinion 17 and the differential housing 14. However, so long as the torque applied to the differential housing 14 is insufficient to contract the spring 42 away from the stationary housing 41, the differential housing 14 is restrained from rotation. Therefore, the pinions 17 rotate about their axes and rotate the gear 19 in a counterclockwise direction, thereby rotating the driven shaft 3 in a counterclockwise direction. Gears 20 and 22 remain stationary by virtue of the fact that their only connection to the shaft 3 is through overrunning clutches.

Now assume that the load carried by the driven shaft 3 is increased. This increases the torque tending to rotate the differential housing 14 and when the torque is increased to a value sufficient to contract the spring 42, the latter is drawn away from the stationary housing 41, thereafter permitting free rotation of the differential housing 14 and the hub 13 which in turn rotates the hub 12 and gear 11 either through the spring 42 or through the dogs 45 and 46 if the latter are spaced to engage prior to full contraction of the spring 42.

The rotation of the differential housing 14 and gear 11 is in a clockwise direction so that gear 49 is rotated in a counterclockwise direction. Bevel gear 52, being keyed to shaft 7, (to which gear 49 is also keyed) is also rotated in a counterclockwise direction. This rotation tends to rotate the differential housing 50 but the latter is restrained from rotation by the spring 56 which is in engagement with the stationary housing 57. Therefore, the differential pinions 51 rotate about their axes, driving the gear 53 and shaft 8 in a clockwise direction. This motion is transmitted through gear 59, gear 22 and the overrunning clutch spring 61 and collar 23 to the driven shaft 3 and, by virtue of the fact that the differential housing 14 revolves at a speed which is the differential of the speeds of the shafts 2 and 3, respectively, there is a gear reduction which applies a greater driving torque to the driven shaft 3 than was applied directly thereto when the differential housing 14 was stationary. Obviously, if desired, the gear reduction obtainable may be increased or decreased by suitably proportioning the gears 11, 49, 59 and 22.

Now if the load applied to the driven shaft 3 is increased still further the torque applied to the differential housing 50 may become sufficient to contract the spring 56 away from the stationary housing 57, thereby permitting the differential housing 50 to rotate at a speed equal to the differential speeds of the shafts 7 and 8. Differential 50, being attached to hub 54 which is in driving engagement with hub 55 and gear 65 (either through the spring 56 or through interengaging dogs on the hubs 54 and 55) will drive the gear 65, which in turn will drive the gear 20 through the idler gear 58. Since the differential housing 50 rotates in a counterclockwise direction with shaft 7, gear 65 will be rotated in a counterclockwise direction, gear 58 in clockwise direction, and gear 20 in counterclockwise direction, which is the desired direction of rotation of the driven shaft 3. The motion of gear 20 is conveyed to the shaft 3 through the overrunning clutch spring 60 and the sleeve 21. Since a gear reduction of substantially one-half is obtained in the differential 50, the gear 20 will drive the shaft 3 at a substantially lower speed than it was previously driven by gear 22. Obviously by suitably proportioning the gears 65, 58 and 20 any desired speed reduction may be obtained.

The operation of the unit under successively increasing loads has been described and it will be observed that the system automatically responds to increases of torque above predetermined limits to first shift from direct (although reversed in direction) drive to an intermediate speed and then to a low speed. If the load on the driven shaft 3 is thereafter reduced, the torque applied to the springs 56 and the springs 42 will become less and less until those springs expand against their stationary housings and lock their associated differential housings against movement. The spring 56 being much heavier than the spring 42 expands first to shift the mechanism back into intermediate speed and thereafter a further reduction in the load and expansion of the springs 42 shifts the mechanism back into the direct drive.

The important feature of the invention is that after the springs 42 and 56 are first contracted they remain contracted by virtue of the torque transmitted therethrough so that they are entirely clear of their surrounding housings and occasion no frictional drag.

Assuming that the transmission set described is employed in a motor car, then the shaft 2 would be driven by the automobile engine, being connected thereto preferably through a clutch, and the driven shaft 3 would be connected to the driving wheels of the automobile through the reversing mechanism 4. In operation when the clutch is first engaged to start the automobile the resistance to rotation of the driven shaft 3 would be relatively great and the spring 42 would immediately be contracted to throw the set into intermediate speed.

If this applied sufficient torque the automobile would thereupon start. However, if the torque were insufficient then the spring 56 would immediately contract, throwing the set into low gear which would give ample power to start the automobile. After initial acceleration the torque would be substantially reduced, permitting the spring 56 to expand and shift the set into intermediate speed.

Thereafter as the car attained the desired speed the torque would be further reduced to permit expansion of the spring 42 and automatic shifting into direct drive. If a hill is approached, then the increase in the torque necessary to propel the car automatically causes the transmission to shift to second or low speed, whichever is necessary.

When using the engine as a brake for retarding the car, direct drive only is available in the mechanism as described since the gears 20 and 22 are connected to the shaft 3 through overrunning clutch mechanisms. Furthermore, the direction of the torque applied by the driven shaft 3 to the differential 14 tends to rotate the latter in a direction to lock the spring 42 even more firmly against the stationary housing 41 so that the differential housing 14 is locked against rotation and the driven shaft 3 drives the driving shaft 2 at the same speed but in the opposite direction.

The spline collar 28 actuated by the fork 30 on rod 29 is provided to positively prevent the driven shaft 3 from rotating faster, relative to the shaft 2, than it would be rotated if driven by shaft 2 in intermediate speed. Thus when the collar 28 is moved forward (the position it occupies when the ball detent 33 is in groove 34) the gear 22 is locked fast to the driven shaft 3. Any rotation of shaft 3 tends to rotate gear 22 which in turn tends to rotate gear 59, which tends to rotate shaft 8. Shaft 8 in turn tends to rotate the shaft 7 through the differential 50 (differenial 50 being locked against rotation by the spring 56) but since shaft 7 is keyed to gear 49 which meshes with gear 11, which in turn is normally locked against rotation by spring 42, there can be no rotation of any of these parts if the driving shaft 2 is stationary. However, if the shaft 2 is being rotated (as by an idling engine of an automobile) then whenever the speed of shaft 2 exceeds the speed of shaft 3, the differential housing 14 will be rotated in a clockwise direction to contract the spring 42 away from the stationary housing 41, permitting the differential housing 14 and the hubs 13 and 12 and gear 11 to rotate, which in turn permits the shaft 3 to rotate slowly. Any rotation of gear 11 faster than differential housing 14, of course, again expands spring 42 against stationary housing 41 and brakes the gear 11. It will be seen, therefore, that when the overrunning clutch comprising spring 61 and sleeve 23 is locked by collar 28, the speed of shaft 3 is automatically limited, (by the braking action of spring 42) to the speed at which it would rotate if being driven by shaft 2 through the intermediate gear train, regardless of whether shaft 2 is driving shaft 3 or the shaft 3 is tending to drive shaft 2.

With the arrangement described, it is possible when employing the mechanism in an automobile to shift from direct drive to intermediate speed when there is no necessity of shifting if the engine is suddenly accelerating even though the automobile may be traveling at high speed. I therefore provide a lockout for locking the mechanism in direct drive when desired. This lockout comprises the pin 38 previously mentioned, which is adapted to engage in one of the apertures 40 in the differential housing 14, thereby positively locking the latter against rotation. This pin 38 is actuated into locking engagement with the differential case 14 by throwing the lever 32 to bring the groove 36 in rod 29 into registration with the ball detent 33.

The mechanism described functions automatically to prevent reversal of the normal direction of rotation of shaft 3 except under very high torques. Thus any reverse motion of shaft 3 is transmitted directly to both gears 20 and 22 through their associated overrunning clutches, tending to rotate those gears. Gears 20 and 22 are positively coupled to rotate gears 65 and 59, respectively, in opposite directions. Rotation of gear 65 is prevented by spring 56 unless sufficient torque is applied to contract the spring away from the housing member 57. However, even if the torque is great enough to do this and rotate differential case 50, then gear 59 rotates the differential gear 53 in the opposite direction, causing shaft 7 and gear 49 to rotate at high speed, but greatly reduced torque, in clockwise direction. This rotates gear 11 and differential case 14 at high speed in counterclockwise direction, and since shaft 3 and differential gear 19 are rotating in clockwise direction, the shaft 2 will be rotated at very high speed but low torque in counterclockwise direction. Relatively slight resistance to rotation of shaft 2 will therefore prevent reverse rotation of shaft 3, even when the reverse torque is sufficient to release spring 56.

The reversing gear mechanism 4 must be provided when the mechanism is employed in an automobile or the like in which the direction of rotation must be reversed. The combination as disclosed gives as many different speeds in reverse as in forward motion since the box 4 is positioned beyond the driven shaft 3. Obviously, if the mechanism is employed for a purpose where there is no need for reversal, the mechanism 4 may be dispensed with.

For purposes of description, a particular application of the invention has been described in detail but it is to be understood that various changes and modifications may be made in the the structure shown without departing from the invention and the latter is to be limited only as set forth in the appended claims.

I claim:

1. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, and clutch means releasable in response to a predetermined torque applied to said member for normally restraining said member from rotation, said clutch means when released offering no restraint to free movement of said member.

2. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, and clutch means releasable in response to a predetermined torque between said member and said other motion transmitting means for normally restraining said member from rotation, said clutch means when released offering no restraint to free movement of said member.

3. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, and clutch means releasable in response to a predetermined torque applied to said member for normally restraining said member from rotation, said clutch means comprising a helical spring secured at one end to said member and a stationary element having a cylindrical surface adapted to be frictionally engaged by said spring, the spring normally engaging said surface and being wound in such direction with reference to the direction of rotation of said member that rotation of said member tends to release said spring from frictional engagement with said surface.

4. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, and clutch means releasable in response to a predetermined torque applied to said member for normally restraining said member from rotation, said clutch means comprising a helical spring interconnecting said member and said other motion transmitting means, and a stationary element having a cylindrical surface adapted to frictionally engage said spring, the spring normally engaging said surface and being wound in such direction with reference to the direction of rotation of said member that driving torque transmitted through said spring from said member to said other motion transmitting means tends to release the spring from engagement with said surface.

5. A mechanism as described in claim 3, with means providing a lost motion connection between said member and said other motion transmitting means for limiting relative motion therebetween.

6. A mechanism as described in claim 4, with stop means for positively limiting relative motion between said member and said other motion transmitting means to a predetermined value.

7. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, and clutch means releasable in response to a predetermined torque applied to said member for normally restraining said member from rotation, in which said clutch means comprises a pair of coaxial hubs in abutting relation, one of which is in driven relation with said member and the other of which is in driving relation with said other motion transmitting means, a helical spring surrounding portions at least of both hubs and attached at opposite ends to the respective hubs, a stationary element surrounding said spring and having a cylindrical inner surface concentric with but spaced from said hubs a distance greater than the radial thickness of said spring, the spring normally being expanded by its own resilience tightly against said surface but contracting away from said surface and toward said hubs in response to predetermined torque between said hubs.

8. A mechanism as described in claim 7, in which one at least of said hubs is provided with spring inserts adapted to bear against said helical spring and aid in forcing the spring outwardly against said surface.

9. A mechanism as described in claim 7, in which the abutting ends of said hubs are provided with inter-engaging members to positively limit relative motion between the hubs to a predetermined value.

10. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, clutch means releasable in response to a predetermined torque applied to said member for normally restraining said member from rotation, and selectively operable means for permanently locking said member against rotation.

11. An automatic variable speed mechanism comprising a driving and a driven shaft, differential means including a rotatable member coupling said driving and driven shafts for normally driving said driven shaft from said driving shaft at a fixed predetermined relative speed when said rotatable member is stationary and at a reduced speed when said member is permitted to rotate, other motion transmitting means connecting said member to said driven shaft for rotating the latter in response to rotation of said member, said motion transmitting means including an overrunning clutch connection to said driven shaft.

12. A mechanism as described in claim 13, with selectively operable means for locking said overrunning clutch connection.

13. A torque responsive brake mechanism for a rotatable member comprising a pair of coaxial hubs inserted in said member in abutting relation to each other, a helical spring surrounding portions at least of both hubs and attached at opposite ends to the respective hubs, a stationary element surrounding said spring and having a cylindrical inner surface spaced radially from said hubs a distance greater than the radial thickness of said spring, the spring normally being expanded by its own resilience tightly against said surface but contracting away from said surface and toward said hubs in response to predetermined torque between said hubs.

14. A mechanism as described in claim 13, in which one at least of said hubs is provided with spring inserts adapted to bear against said helical spring and aid in forcing the spring outwardly against said surface.

15. A mechanism as described in claim 13, in which the abutting ends of said hubs are provided with interengaging members to positively limit relative motion between the hubs to a predetermined value.

RICHARD G. LA FOUNTAIN.